(12) United States Patent
Oezkan et al.

(10) Patent No.: US 8,973,979 B2
(45) Date of Patent: Mar. 10, 2015

(54) BODYWORK

(75) Inventors: Ali Oezkan, Leonberg (DE); Klaus Bohnert, Muehlacker (DE); Gernot Jenisch, Wimsheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 3 days.

(21) Appl. No.: 12/276,680

(22) Filed: Nov. 24, 2008

(65) Prior Publication Data

US 2009/0134668 A1 May 28, 2009

(30) Foreign Application Priority Data

Nov. 24, 2007 (DE) .......................... 10 2007 056 673

(51) Int. Cl.
*B62D 25/20* (2006.01)
*B62D 25/02* (2006.01)

(52) U.S. Cl.
CPC ............ *B62D 25/20* (2013.01); *B62D 25/2036* (2013.01); *B62D 25/025* (2013.01)
USPC ...................................... 296/193.07; 296/204

(58) Field of Classification Search
USPC .................................. 296/204, 193.07, 181.4
See application file for complete search history.

(56) References Cited

U.S. PATENT DOCUMENTS

| | | | |
|---|---|---|---|
| 2,646,991 A * | 7/1953 | Weaving et al. ............... | 280/794 |
| 4,514,008 A | 4/1985 | Watanabe et al. | |
| 4,898,419 A | 2/1990 | Kenmochi et al. | |
| 5,501,289 A | 3/1996 | Nishikawa et al. | |
| 5,849,122 A | 12/1998 | Kenmochi et al. | |
| 6,015,183 A * | 1/2000 | Vlahovic ...................... | 296/204 |
| 6,382,710 B1 * | 5/2002 | Funk et al. ............... | 296/187.12 |
| 6,428,085 B1 * | 8/2002 | Miyasaka et al. ........ | 296/187.12 |
| 6,604,781 B2 | 8/2003 | Uchida | |
| 7,600,807 B2 * | 10/2009 | Bachmann ............... | 296/187.08 |
| 2008/0047771 A1 * | 2/2008 | Ujimoto et al. ............... | 180/326 |
| 2008/0315630 A1 | 12/2008 | Klimek | |

FOREIGN PATENT DOCUMENTS

| | | |
|---|---|---|
| DE | 24 44 016 | 3/1976 |
| DE | 38 09 185 C2 | 10/1988 |
| DE | 38 37 231 C2 | 5/1989 |
| DE | 42 05 891 A1 | 9/1993 |
| DE | 196 27 610 A1 | 1/1998 |
| DE | 199 09 726 A1 | 9/2000 |

(Continued)

OTHER PUBLICATIONS

European Search Report dated Mar. 6, 2009.

*Primary Examiner* — Dennis H Pedder
(74) *Attorney, Agent, or Firm* — Gerald E. Hespos; Michael J. Porco; Matthew T. Hespos

(57) ABSTRACT

A motor vehicle bodywork has a floor assembly with an upwardly convex and downwardly open longitudinal center tunnel and two side sills parallel thereto. Floor elements are disposed between the longitudinal center tunnel and the side sills. A driver side and a passenger side are each provided with at least one front and one rear seat crossmember, seen in the direction of travel. The seat cross-members extend in the transverse direction of the vehicle and rest on the associated floor elements. It is important that the driver side and/or passenger side seat cross-members are each connected to each other in their upper regions via a plate-like thrust element.

5 Claims, 4 Drawing Sheets

(56) References Cited

FOREIGN PATENT DOCUMENTS

| | | |
|---|---|---|
| DE | 102 12 218 B4 | 11/2005 |
| DE | 10 2006 015 872 A1 | 10/2007 |
| EP | 00 66 963 B1 | 12/1982 |
| GB | 2 211 798 A | 7/1989 |
| GB | 2 347 653 A | 9/2000 |
| JP | 57-201777 A | 12/1982 |
| JP | 60-161275 A | 8/1985 |
| JP | 62-125956 A | 6/1987 |
| JP | 10-291443 * | 11/1998 |
| JP | 2005-161975 A | 6/2005 |
| KR | 10 2002 008 1614 A | 10/2002 |
| WO | 2007/017198 A1 | 2/2007 |

* cited by examiner

_US 8,973,979 B2_

BODYWORK

CROSS-REFERENCE TO RELATED APPLICATION

This application claims the priority, under 35 U.S.C. §119, of German application DE 10 2007 056 673.7, filed Nov. 24, 2007; the prior application is herewith incorporated by reference in its entirety.

BACKGROUND OF THE INVENTION

Field of the Invention

The present invention relates to a motor vehicle bodywork with a floor assembly, which contains an upwardly convex and downwardly open longitudinal center tunnel and two side sills parallel thereto, and floor elements arranged between the longitudinal center tunnel and the side sills.

German patent DE 102 12 218 B4, corresponding to U.S. Pat. No. 6,604,781, discloses a vehicle bodywork of the type in question, wherein a first, a second and a third transverse element are provided on the floor assembly in order to improve the rigidity of the vehicle bodywork in the transverse direction of the vehicle. Together with an additional transverse element, the third transverse element forms a hollow cross section running in the transverse direction of the vehicle, with the third and the additional transverse element being fastened to the longitudinal center tunnel, to the first and to the second transverse element and to the associated side sill. In this case, the transverse elements virtually exclusively bring about a reinforcement of the vehicle bodywork in the transverse direction of the vehicle.

International patent disclosure WO 2007/017198 A1 discloses a motor vehicle with a bodywork which has a floor structure and with at least one reinforcing element for reinforcing the floor structure. The reinforcing element has waves which likewise reinforce the floor structure virtually exclusively in the transverse direction of the vehicle.

A floor structure for a motor vehicle is likewise known from European patent EP 0 066 963 B1, corresponding to U.S. Pat. No. 4,514,008, in which a reinforcing element is provided, the reinforcing element crossing an upwardly convex and downwardly open longitudinal center tunnel and being arranged in the region of two seat crossmembers which run in the transverse direction of the vehicle.

A similar reinforcing element is also known from Japanese patent application JP 2005161975 A.

Further reinforced floor structures for motor vehicles are known, or example, from South Korean patent application KR 1020020081614 A, from German patent DE 38 09 185 C2 (corresponding to U.S. Pat. No. 4,898,419), from German patent DE 38 37 231 C2 (corresponding to U.S. Pat. No. 5,849,122) and from German patent DE 24 44 016.

SUMMARY OF THE INVENTION

It is accordingly an object of the invention to provide a bodywork that overcomes the above-mentioned disadvantages of the prior art devices of this general type, with which better reinforcement of the bodywork can be obtained in comparison to the prior art.

With the foregoing and other objects in view there is provided, in accordance with the invention, a motor vehicle bodywork having a floor assembly with a driver side and a passenger side. The floor assembly contains an upwardly convex and downwardly open longitudinal center tunnel, two side sills disposed parallel to the longitudinal center tunnel, floor elements disposed between the longitudinal center tunnel and the side sills, and seat cross-members. The seat cross-members include at least one front and one rear seat cross-member disposed on each of the driver side and the passenger side, and as seen in a direction of travel, the seat cross-members extend in a transverse direction of the motor vehicle and resting on an associated one of the floor elements. Plate-shaped thrust elements are provided. The seat cross-members of the driver side and of the passenger side are each connected to each other in their upper regions via one of the plate-like thrust elements.

The present invention is based on the general concept of reinforcing a motor vehicle bodywork in the region of a floor assembly, by a plate-shaped thrust element resting on a front and a rear seat cross-member. This results in an extremely stiff torsion box which substantially contains the two seat crossmembers extending in the transverse direction of the vehicle, the plate-like thrust element and floor elements on which the two seat crossmembers rest. In general, the floor assembly contains an upwardly convex and downwardly open longitudinal center tunnel and two side sills parallel thereto. The floor elements on which the two seat crossmembers rest and to which they are fixedly connected are arranged between the longitudinal center tunnel and the two side sills. In this case, the thrust elements which are of plate-like configuration are not only fixedly connected to a respectively upper region of the front and rear seat crossmembers but also can be connected to the longitudinal center tunnel and to the respectively associated side sill. This creates a hollow cross section which contains the front and rear seat crossmember, the associated floor element and the associated thrust element and which reinforces the floor assembly or the bodywork not only in the transverse direction of the vehicle but also in the longitudinal direction of the vehicle and obliquely with respect thereto. In particular, the torsional rigidity of the motor vehicle can be increased by a reinforcing box formed in such a manner.

In an advantageous development of the solution according to the invention, a tunnel bridge is provided in the region between the driver side and passenger side thrust elements. The tunnel bridge crosses the longitudinal center tunnel and thus, together with the thrust elements, produce a continuous thrust zone which reaches from the one to the other side sill. The longitudinal center tunnel can easily be deformed in particular in the transverse direction of the vehicle, since it has a substantially U-shaped cross section which is open downward. In order to be able to increase the rigidity of the bodywork and therefore the motor vehicle, the cross section of the longitudinal center tunnel has to be reinforced, in particular in the transverse direction of the vehicle, this being realized by the proposed tunnel bridge according to the invention. By the two thrust elements and the tunnel bridge arranged in between, a thrust zone which is continuous from the one side sill to the other side sill can therefore be produced, thus enabling a particularly stiff bodywork to be obtained.

The tunnel bridge is expediently configured as a hollow profile, with at least one reinforcing element running in the transverse direction of the vehicle being provided within the tunnel bridge, in particular in the manner of a transverse bulkhead. A transverse bulkhead of this type additionally reinforces the tunnel bridge in the transverse direction of the vehicle and, furthermore, increases the torsional rigidity of the tunnel bridge. In this case, the reinforcing elements are preferably produced together with the tunnel bridge, if the latter is cast, for example, or are connected fixedly thereto, for example welded, in a later working step.

The tunnel bridge, at its end projecting into the longitudinal center tunnel, is expediently of a concave configuration at least in some regions. Such a concave configuration creates a hollow cross section which is continuous in the longitudinal direction of the vehicle and is bounded on one side by that region of the tunnel bridge which is of concave configuration and on the other side by the longitudinal center tunnel. Supply lines can be accommodated in the hollow cross section, with the concave configuration of that end of the tunnel bridge which projects into the longitudinal center tunnel at the same time permitting positional fixing by the supply lines guided through the hollow cross section.

In a further advantageous embodiment of the solution according to the invention, the external dimensions of the tunnel bridge are matched to an internal profile of the longitudinal center tunnel, in particular are configured in a complementary manner with respect thereto, such that the tunnel bridge projects at least partially into the downwardly open longitudinal center tunnel and bears against an inner wall of the longitudinal center tunnel. The matched external dimensions of the tunnel bridge permit the latter to be inserted in a precisely fitting manner into the longitudinal center tunnel, thus in particular facilitating the assembly. At the same time, by the tunnel bridge bearing in a precisely fitting manner against the inner surface of the longitudinal center tunnel, a virtually play-free transmission of forces is possible, as a result of which a particularly high reinforcing effect can be obtained.

It goes without saying that the features mentioned above and those which have yet to be explained below can be used not only in the respective stated combination but also in different combinations or on their own without departing from the scope of the present invention.

Preferred exemplary embodiments of the invention are illustrated in the drawings and are explained in more detail in the description below, with the same reference numbers referring to identical or similar or functionally identical components.

Other features which are considered as characteristic for the invention are set forth in the appended claims.

Although the invention is illustrated and described herein as embodied in a bodywork, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
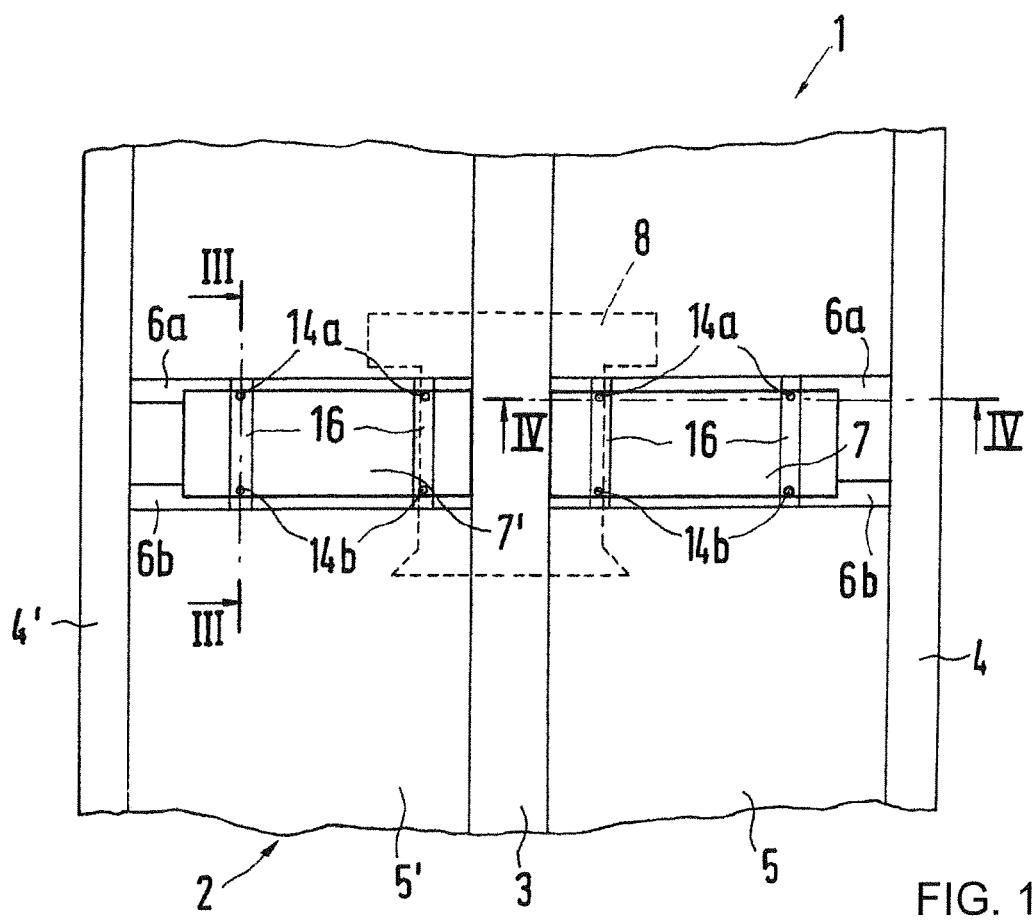
FIG. 1 is a diagrammatic, partial top view of a bodywork according to the invention.
Figure 2:
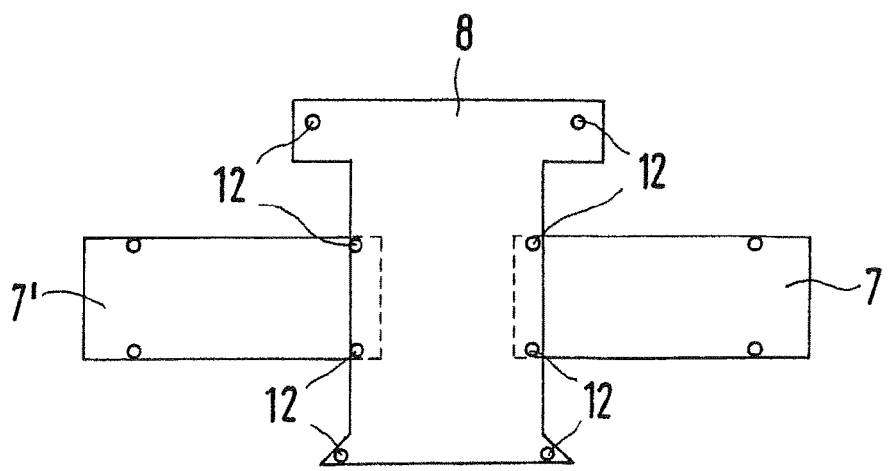
FIG. 2 is a diagrammatic, bottom view of plate-like thrust elements and a tunnel bridge.

Referring now to the figures of the drawing in detail and first, particularly, to FIG. 1 thereof, there is shown a bodywork 1 according to the invention for a motor vehicle (otherwise not illustrated) that has a floor assembly 2. The floor assembly 2 includes a longitudinal center tunnel 3, two side sills 4 and 4' which are arranged laterally with respect thereto and run parallel to the longitudinal center tunnel 3, and floor elements 5 and 5'. In this case, the longitudinal center tunnel 3 runs in a customary manner between the two floor elements 5 and 5' parallel to a longitudinal direction of the vehicle. The floor elements 5 and 5' are each connected fixedly at one end to the longitudinal center tunnel 3 and at the other end to the associated side sill 4, 4'.

A front and a rear seat crossmember 6a and 6b, as seen in the direction of travel, extend in a transverse direction of the vehicle both on the driver side and on the passenger side (see FIGS. 1, 3 and 5) and rest on the associated floor element 5 and 5' or are connected fixedly thereto. In order to be able to reinforce the bodywork 1 to the greatest possible extent, the driver side and/or passenger side seat cross-members 6a and 6b are each connected to each other in their upper regions via a plate-like thrust element 7, 7', as a result of which a torsion-proof or shearing-resistant hollow cross section is formed from the thrust element 7, 7', the two seat crossmembers 6a and 6b and the associated floor element 5 or 5'. The respective thrust element 7, 7' can be connected at one end to the longitudinal center tunnel 3 and at the other end to the associated side sill 4, 4', thus resulting in an additional reinforcement of the bodywork 1. Those ends of the two thrust elements 7, 7' which extend in the transverse direction of the vehicle can also be arranged at a lateral distance from the longitudinal center tunnel 3 and from the side sill 4, 4'. The bodywork 1 according to the invention forms a shearing-resistant zone which reinforces the bodywork both in the longitudinal and in the transverse direction of the vehicle, and in relation to any torsional moments which may occur.

Figures 6A, 6B:
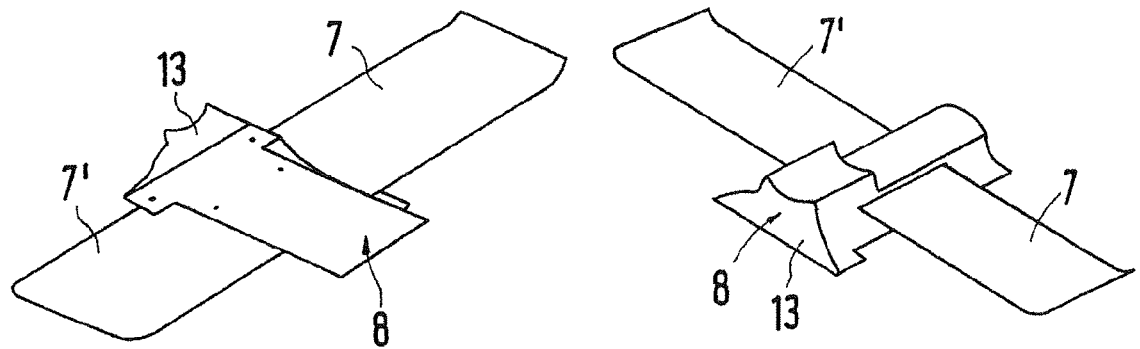
FIGS. 6A and 6B are diagrammatic, perspective views of the plate-like thrust elements and the tunnel bridge.
Figure 7:
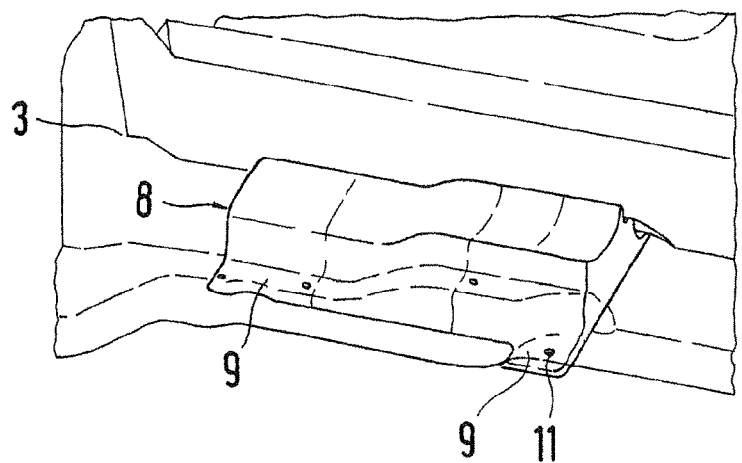
FIG. 7 is a diagrammatic, partially sectioned perspective view of the bodywork with the tunnel bridge.

As can be gathered in FIG. 1, the longitudinal center tunnel 3, which can form a point of weakness in particular in the transverse direction of the vehicle on account of its profile which is U-shaped in cross section and is downwardly open, is arranged in the region between the thrust elements 7, 7' on the driver side and passenger side. For this reason, a tunnel bridge 8 is provided, the tunnel bridge 8 crossing the longitudinal center tunnel 3 and thus, together with the two thrust elements 7, 7', producing a continuous thrust zone which reaches from the one to the other side sill 4, 4'. This is illustrated, for example, in FIGS. 6A and 6B in which the tunnel bridge 8 and the two thrust elements 7, 7' are illustrated in isolated form.

The tunnel bridge 8 can be inserted in a simple manner from below into the longitudinal center tunnel 3 and can be screwed to lateral edges 10 of the longitudinal center tunnel 3 via flanges 9. In order to fasten the tunnel bridge 8 to the bodywork 1, the latter therefore has at least one flange 9 which, when the tunnel bridge 8 is in its fitted position, bears from below against the lateral edges 10 of the longitudinal center tunnel 3. In this case, passage openings 11 through which, for example, screws for fastening the tunnel bridge 8 to the bodywork 1 can be guided and can be screwed to the latter are provided in the flange 9. The screws for the tunnel bridge 8 are indicated by the reference number 12.

In order to be able to optimize the reinforcing effect, the tunnel bridge 8 here is configured as a hollow profile and has external dimensions which are matched to an internal profile of the longitudinal center tunnel 3 in such a manner that the tunnel bridge 8 projects at least partially into the downwardly open longitudinal center tunnel 3 and bears, preferably in a planar manner, against an inner wall of the longitudinal center tunnel 3. In addition, one or more reinforcing elements 13 which are configured in particular as "transverse bulkheads" and which extend in the transverse direction of the vehicle can be provided on the tunnel bridge 8 which is configured as a hollow profile. The transverse bulkheads bring about significant reinforcement of the tunnel bridge 8.

An appropriate selection of material is likewise important to provide the tunnel bridge 8 with a high degree of rigidity, and therefore the tunnel bridge 8 can be formed, for example, from light metal, in particular from aluminum, as a result of which, in addition to the increased rigidity, a low weight can be achieved at the same time. The same applies accordingly also to the two thrust elements 7, 7'.

Since supply lines and/or drive elements are customarily guided in the longitudinal center tunnel 3, the tunnel bridge 8, at its end which projects into the longitudinal center tunnel 3, can be of a concave configuration at least in some regions such that, with the concave region of the tunnel bridge 8 and the longitudinal center tunnel 3, a passage cross section which is open in the longitudinal direction of the motor vehicle and permits supply lines and/or drive elements to be routed through it is produced.

The tunnel bridge 8 can be fastened in the longitudinal center tunnel 3 not only via one flange 9 but also via a plurality of flanges 9 or 9' which, according to a particularly preferred embodiment, are arranged in two planes with respect to each other, with the flange 9', for example, being of a ramp-like configuration and bearing against a step, which runs in a complementary manner with respect thereto, in the interior of the longitudinal center tunnel 3. The flanges 9 and 9' and therefore the tunnel bridge 8 are usually fastened in the longitudinal center tunnel 3 via a screw connection.

Figure 5:
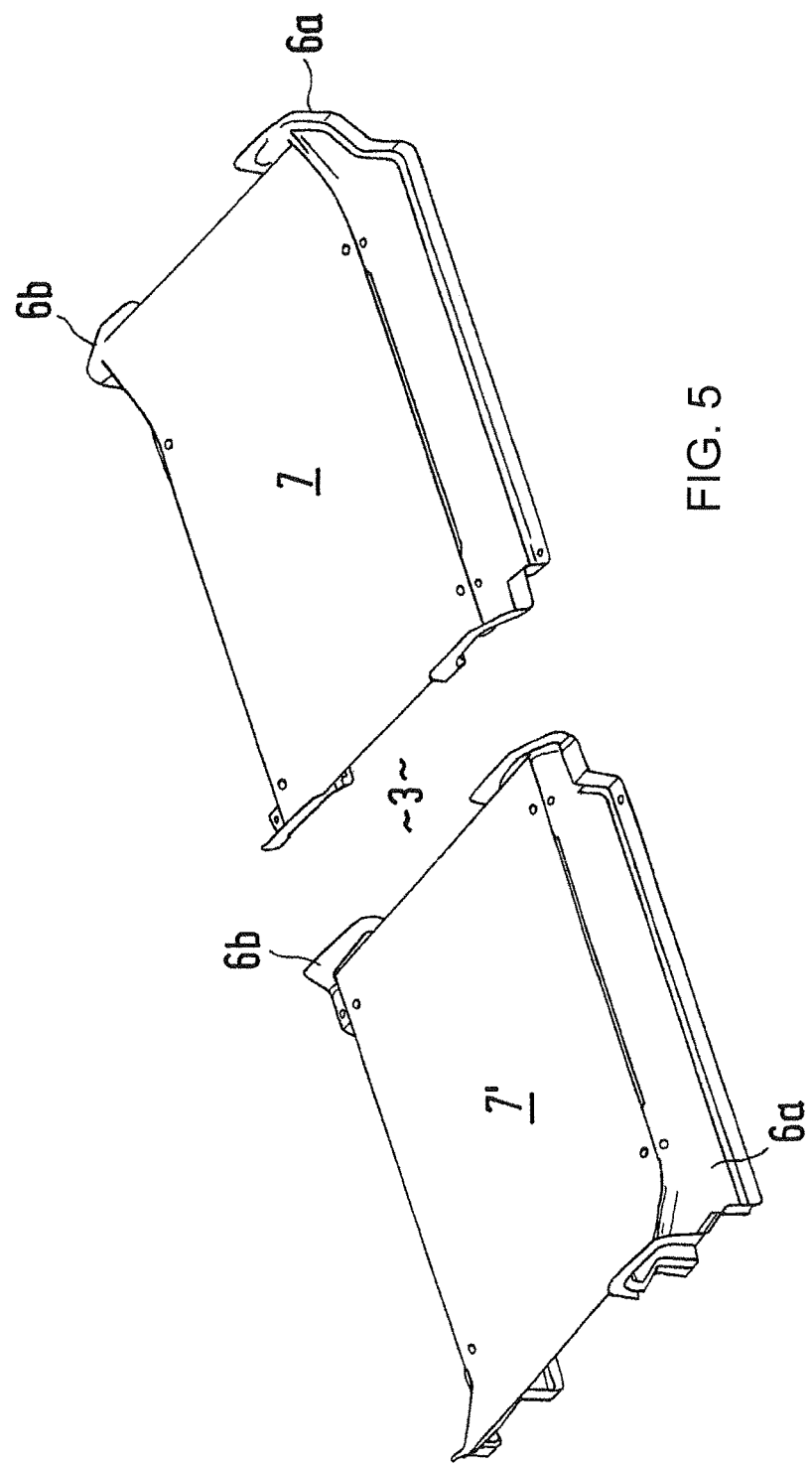
FIG. 5 is a diagrammatic, perspective view of the two plate-like thrust elements and of the seat cross-members.

Of course, depending on the configuration, it may also be provided that the thrust elements 7, 7', as shown, for example, in FIG. 5, are of curved construction at least at one end which here faces the side sill 4 or 4'. Otherwise, however, they have the abovementioned plate-like shape which brings about the characteristically increased shearing strength.

By the bodywork 1 according to the invention, it is therefore possible to reinforce a motor vehicle equipped therewith not only in the transverse direction of the vehicle but also in the longitudinal direction of the vehicle, and, in particular, to bring about an increase in the torsional rigidity, for which purpose only a few additional elements, such as, for example, the thrust elements 7, 7' and the tunnel bridge 8, are required.

Each thrust element 7, 7' is connected to the front seat crossmember 6a and to the rear seat crossmember 6b via releasable fastening elements 15 (fastening screws) at at least two fastening points 14a, 14b which are arranged spaced apart—as seen in the transverse direction of the vehicle.

Figure 3:
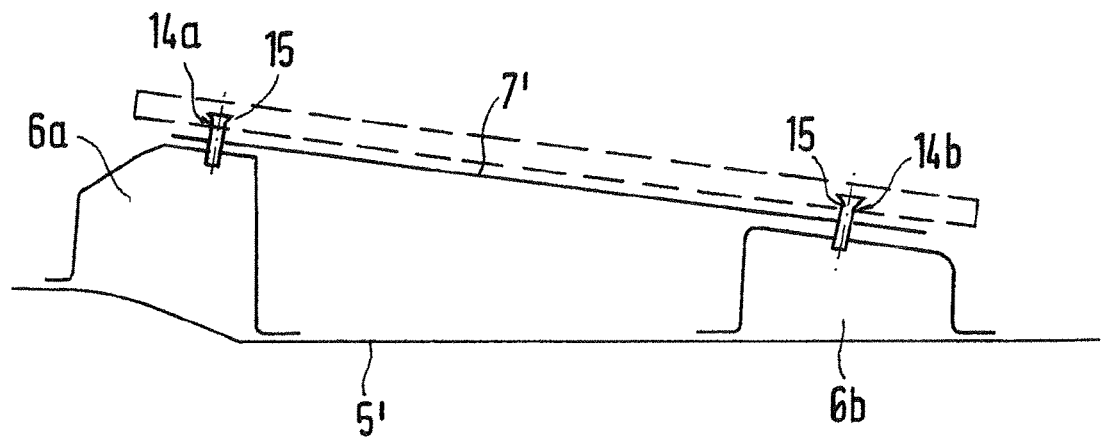
FIG. 3 is a diagrammatic, enlarged sectional view taken along the line III-III shown in FIG. 1.
Figure 4:
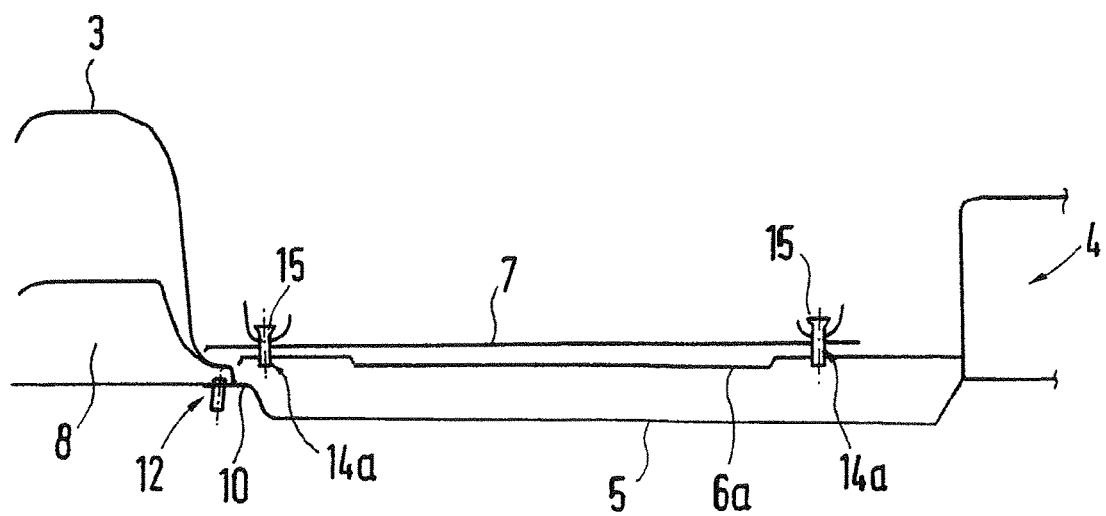
FIG. 4 is a diagrammatic, enlarged sectional view taken along the line IV-IV shown in FIG. 1.

According to FIGS. 3 and 4, in addition to the thrust elements 7, 7', seat rails 16 which are on the vehicle body, extend in the longitudinal direction of the vehicle and are placed onto the upper side of the thrust elements 7, 7', are fastened at the same time by the releasable fastening elements 15.

The invention claimed is:

1. A motor vehicle bodywork, comprising:
   a floor assembly having a driver side and a passenger side spaced apart in a transverse direction of the motor vehicle, the floor assembly containing:
   an upwardly convex and downwardly open longitudinal center tunnel extending in a longitudinal direction that is perpendicular to the transverse direction;
   a driver side sill and a passenger side sill disposed respectively on the driver side and the passenger side and extending in the longitudinal direction;
   a driver side floor element and a passenger side floor element disposed between said longitudinal center tunnel and the respective driver side sill and the passenger side sill;
   downwardly concave front and rear driver side seat cross-members disposed on the driver side and downwardly concave front and rear passenger side seat cross members disposed on the passenger side, the cross members extending in the transverse direction of the motor vehicle from the center tunnel to a respective one of the driver side and passenger side sills, each of the respective driver side and passenger side seat cross-members having front and rear bottom ends resting respectively on the driver side floor element and the passenger side floor element and having upper surfaces opposite the floor elements;
   a driver side thrust element and a passenger side thrust element secured respectively to the upper surfaces of the driver side seat cross members and the upper surfaces of the passenger side seat cross members at fastening points and being opposed to the respective floor element on the driver side and the passenger side, each of the thrust elements being a plate shaped light metal and being continuous and substantially linear in the longitudinal direction at all locations thereon from the respective front seat cross member to the rear seat cross member, the plate shape thrust element, the floor element and the seat cross members on the driver side defining a driver side torsional box, the plate shaped thrust element, the floor element and the seat cross members on the passenger side defining a passenger side torsional box, the torsional boxes providing an increase in torsional stiffness of the motor vehicle and the floor elements in both the transverse direction and the longitudinal direction;
   driver side and passenger side seat rails extending linearly in the longitudinal direction and secured on upper surfaces of the respective driver side and passenger side thrust elements by fasteners passing through the respective thrust elements and into the seat cross members; and
   a tunnel bridge formed from a light metal and disposed in a region between the plate-shaped thrust elements on the driver side and the passenger side, the tunnel bridge defining a closed cross-section hollow profile crossing the longitudinal center tunnel and includes at least one bulkhead extending in the transverse direction across the downwardly open longitudinal center tunnel at a position between the plate-shaped thrust elements to produce a continuous thrust zone extending between the side sills.

2. The bodywork of claim 1, wherein the driver side floor element is connected fixedly to the longitudinal center tunnel and the driver side sill and the passenger side floor element is connected fixedly to the longitudinal center tunnel and the passenger side sill.

3. The bodywork of claim 1, wherein the thrust elements extend to locations on the seat cross-members substantially adjacent the longitudinal center tunnel.

4. The bodywork of claim 1, wherein the tunnel bridge is nested at least partly into the downwardly open longitudinal center tunnel and engages against inwardly facing surfaces of the downwardly open center tunnel.

5. The bodywork of claim 4, wherein the longitudinal center tunnel has lateral edges, and the tunnel bridge has lateral flanges that bear from below against the lateral edges of the longitudinal center tunnel.

\* \* \* \* \*